United States Patent Office 2,858,318
Patented Oct. 28, 1958

2,858,318 p-SUBSTITUTED BENZENE SULPHONAMIDES

Willy Stoll, Basel, Wilfried Graf, Riehen, near Basel, and Erich Schmid, Basel, Switzerland, assignors to Geigy Chemical Corporation, New York, N. Y., a corporation of Delaware No Drawing. Application April 8, 1957
Serial No. 651,143

Claims priority, application Switzerland April 19, 1956

6 Claims. (Cl. 260—302)

The present invention concerns processes for the production of new p-substituted benzene sulphonamides as well as the compounds obtained according to these processes which have valuable pharmacological properties.

After sulphanilamide had been used widely in chemotherapeutics, Mann and Keilin, Nature 146, 164 (1940) found that it inhibited carbonic anhydrase whilst the numerous $N_1$-substituted chemotherapeutic active substances had no such action.

Surprisingly it has now been found that p-substituted benzene sulphonamides which correspond to the general formula:

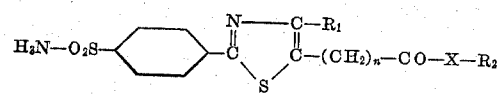

I in which $R_1$ represents hydrogen or an alkyl, alkoxyalkyl, carboxy, carbalkoxy, carbamyl, cycloalkyl, aralkyl, aryl, hydroaryl, furyl, thienyl or thienylalkyl radical and wherein any aromatic ring in $R_1$ can be substituted by halogen, alkyl, alkoxy, alkylendioxy, amino, acylamino, carboxy, carbalkoxy, carbamyl, sulphamyl or sulphonic acid groups, $R_2$ by itself represents hydrogen, an alkyl, alkenyl, aralkyl or dialkylaminoalkyl radical, an alkyleniminoalkyl radical having 5—6 ring members or a morpholino alkyl radical, X by itself represents oxygen, NH or $NR_2$, or $X-R_2$ together represents an alkylenimino radical having 5—6 ring members or the morpholino radical, and $n$ represents 0 or 1, inhibit carbonic anhydrase considerably more than simple aromatic sulphonamides such as sulphanilamide or p-sulphamyl benzoic acid.

Such compounds can be produced in a simple manner by condensing p-thiocarbamyl benzene sulphonamide (p-sulphamylthiobenzamide), of the general Formula II with compounds, in particular halogen oxocarboxylic acid esters, of the general Formula III, according to the reaction scheme:

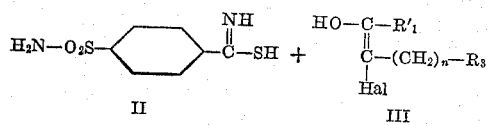

II    III wherein $R'_1$ and $R_3$ have the meanings given for the radicals $R_1$ and $-CO-X-R_2$ respectively but in addition also represent further radicals which can be converted into carboxy groups by hydrolysis and/or oxidation or, in the case of $R'_1$, can also contain such radicals, Hal represents chlorine or bromine, and $n$ represents 0 or 1.

Compounds which contain one or more carbalkoxy groups or which contain other radicals which can be converted into carboxy groups by hydrolysis or by hydrolysis and subsequent oxidation, may then be partially hydrolysed in such a manner that the sulphonamide group is retained, the partial hydrolysis being performed advantageously in an alkaline medium, and then or instead of the partial hydrolysis, oxidising any oxidisable groups liberated by the partial hydrolysis or originally present to carboxy groups if necessary. If desired, compounds which contain carboxy groups can then be converted into compounds having halogenocarbonyl groups by treating them with inorganic acid halides and the compounds having halogenocarbonyl groups or, if desired, also compounds which contain carbalkoxy groups, can be reacted with compounds of the general formula:

$$H-X-R_2 \qquad IV$$

wherein $R_2$ and X have the meanings given above.

According to a further process, the p-substituted benzene sulphonamides as defined can be produced by reacting p-substituted benzene sulphonic acid derivatives, in particular benzene sulphochlorides of the general formula:

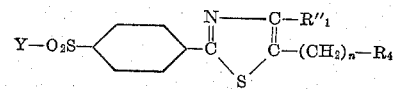

V in which Y represents chlorine, bromine or an aryloxy group and $R''_1$ and $R_4$ have the meanings given for the radicals $R_1$ and $-CO-X-R_2$ respectively but in addition $R''_1$ can represent a halogenocarbonyl group or a radical $R_1$ which contains a halogenocarbonyl or a halogenosulphonyl group instead of carbamyl groups or a sulphamyl group, and $R_4$ can represent a halogenocarbonyl group, and $n$ has the meaning given above, with the amount of ammonia corresponding to the number of acid halide groups present, the reaction being performed in the presence of an acid binding agent, advantageously in excess ammonia. The sulphohalides necessary as starting materials for this process are new in themselves and can be produced by processes known per se which will be more closely described below.

Finally, p-substituted benzene sulphenamides of the general formula:

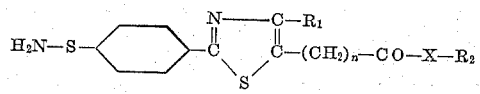

VI can be converted into p-substituted benzene sulphonamides of the general Formula I by treatment with oxidising agents such as e. g. potassium permanganate.

The condensation according to the first production process can be performed with good yields, e. g. by heating the reaction components in aqueous alcohol without any condensing agents or catalysts. In particular the ethyl and methyl esters of α-acyl-α-halogen acetic acids are used as halogen oxocarboxylic acid derivatives. Examples of such are the α-chloro- and α-bromo-acetoacetic acid ethyl esters and methyl esters, propionyl, butyryl, isobutyryl, isovaleryl, enanthyl, caprylyl, dibutylacetyl, methoxyacetyl, cyclopropancarbonyl, cyclohexane carbonyl, cyclohexane acetyl, phenyl acetyl, m.p-dimethylphenyl acetyl, β-phenyl-propionyl, β-(m.p-dimethylphenyl)-propionyl, γ-phenyl-butyryl, β-phenyl-isobutyryl, benzoyl, p-methyl-benzoyl, m.p-dimethyl-benzoyl, p-anisoyl, p-chloro-benzoyl, piperonylyl, p-acetylamino-benzoyl, hydroindenyl-(5)-acetyl, 1.2.3.4-tetra-hydro-1-naphthoyl, furoyl, thiophene-(2)-carbonyl and β-thienyl-propionyl bromoacetic acid ethyl esters or chloroacetic acid ethyl esters, bromo-oxalacetic acid diethyl ester and p-carbethoxy-benzoyl bromoacetic acid ethyl ester. End products in which $n$ represents 1 are obtained e. g. by using β-acyl-β-halogen propionic acid alkyl esters such as the methyl and ethyl esters of β-chloro- and β-bromo-levulinic acid and β-benzoyl-β-bromo-propionic acid. If, instead of halogen oxocarboxylic acid derivatives, derivatives of halogen malonic dialdehydes are used for example such as the α-bromo-β.β-diethoxy propionaldehyde, then on condensing with p-sulphamyl thiobenzamide, 2-(p-sulphamyl-phenyl)-thiazole-5-aldehyde is obtained, i. e. a compound having a radical $R_3$ which can be converted by oxidation into the carboxy group. The oxidation is performed by the methods known for the conversion of an aldehyde into a carboxylic acid such as e. g. oxidation with oxygen or air in the presence of heavy metal catalysts. The oxidation can also be performed with hydrogen peroxide, potassium permanganate in alkaline solution, diluted nitric acid, chlorine or bromine water.

p-Substituted benzene sulphochlorides of the general Formula V can be reacted direct or after solution in inert solvents with excess ammonia, if necessary on heating. The starting materials necessary for this process can be obtained e. g. by oxidising chlorination of p-[5-carboxy-thiazolyl-(2)]-phenyl benzyl sulphides, which may be substituted in the 4-position, or of bis-[p-5-carboxy-thiazolyl-(2)-phenyl]-disulphides as well as of the esters thereof. p-Substituted benzene sulphochlorides of the general Formula V can also be produced by reducing a p-[5-carboxy-thiazolyl-(2)]-nitrobenzene which may be substituted in the 4-position, to the amino compound, converting this into the corresponding diazonium chloride and treating the latter with sulphur dioxide in a non-water containing solution. On reacting sulphur dioxide in a solution containing water; first a sulphinic acid is obtained which can be converted by methods known per se into the corresponding sulphochloride. The benzene derivatives used in the above process which have a substituted thiazolyl radical in the p-position to a radical which is capable of being converted, such as the benzyl sulphides, disulphides or 4-substituted p-[5-carboxy-thiazolyl-(2)]nitrobenzenes and the esters thereof are obtained in a manner analogous to the first production process named by using p-benzyl-mercapto-thiobenzamide, p.p'-dithio-bis-thiobenzamide or p-nitrothiobenzamide for the condensation with halogen oxocarboxylic acid esters of the general Formula III instead of p-sulphamyl thiobenzamide, and, possibly hydrolysing the p-[5-carbalkoxy-thiazolyl-(2)]-benzene derivatives obtained.

The p-substituted benzene sulphenamides of the general Formula VI which are starting materials for the third general production process are obtained for example from the p-[5-carboxy-thiazolyl-(2)]-phenyl benzyl sulphides mentioned in the previous paragraph, from bis-p-[5-carboxy-thiazolyl-(2)-phenyl]-disulphides, from 2-(p-mercapto-phenyl)-thiazole-5-carboxylic acids obtained therefrom by reduction as well as from the esters corresponding to all these acids, by reacting with alkali hypochlorites in the presence of ammonia.

The following examples further illustrate the production of the new compounds. Parts are given as parts by weight. Their relationship to parts by volume is as that of grammes to cubic centimetres. The temperatures are in degrees centigrade.

EXAMPLE 1

21.6 parts of p-sulphamyl thiobenzamide are dissolved in 200 parts by volume of 50% alcohol and 15.0 parts of α-chloracetoacetic acid methyl ester are added at 50°. After boiling for 15 hours, the reaction mixture is cooled and filtered. The 2-(p-sulphamyl-phenyl)-4-methyl thiazole-5-carboxylic acid methyl ester obtained (M.P. 216°) is saponified by boiling with diluted caustic soda lye. On acidification of the solution, 2-(p-sulphamyl-phenyl)-4-methyl thiazole-5-carboxylic acid is obtained in the form of fine crystal needles. (M. P. 248° from methanol, with decomposition.)

EXAMPLE 2

45.5 parts of formyl chloroacetic acid ethyl ester are refluxed for 3 hours with 150 parts by volume of alcohol, 50 parts of water and 79 parts of p-sulphamyl thiobenzamide. After cooling, the crystals are drawn off under suction and recrystallised from alcohol. 2-(p-sulphamyl-phenyl)-thiazole-5-carboxylic acid ethyl ester melts at 213–215°. A further amount is obtained by concentrating the mother liquors.

To saponify the ester, 6 parts thereof are heated to 90° for 2 hours in 100 parts of 2 N-caustic soda lye. The 2-(p-sulphamyl-phenyl)-thiazole-5-carboxylic acid is precipitated by the addition of concentrated hydrochloric acid until the reaction is clearly acid to Congo red paper. It is drawn off under suction, dried and recrystallised from alcohol; it decomposes at about 246°.

EXAMPLE 3

31 parts of benzoyl chloroacetic acid ethyl ester, 300 parts by volume of alcohol and 29 parts of p-sulphamyl thiobenzamide are refluxed for 15 hours. The reaction mixture is then cooled and the precipitated crystals of 2-(p-sulphamyl-phenyl)-4-phenyl thiazole-5-carboxylic acid ethyl ester are drawn off under suction.

After recrystallising from alcohol, the ester melts at 209.5–211°.

3.2 parts of this ester are heated for 3 hours in a water bath with 20 parts by volume of 2 N-caustic soda lye, the solution is acidified while warm with concentrated hydrochloric acid and the 2-(p-sulphamyl-phenyl)-thiazole-4-phenyl-5-carboxylic acid is filtered off under suction. It precipitates in a fairly pure form and decomposes at 251–252°.

EXAMPLE 4

8 parts of phenylacetyl-chloroacetic acid ethyl ester are refluxed for 6 hours with 30 parts by volume of alcohol, 20 parts of water and 7 parts of p-sulphamyl thiobenzamide. The reaction product is worked up as described in Example 1. The melting point of the pure 2-(p-sulphamyl-phenyl)-4-benzyl thiazole-5-carboxylic acid ethyl ester is 209–211°. It is saponified as described in Example 1. 2-(p-sulphamyl-phenyl)-4-benzyl thiazole-5-carboxylic acid decomposes at about 238–239°.

EXAMPLE 5

23 parts of α-(p-carbethoxy-benzoyl)-α-chloroacetic acid ethyl ester are refluxed for 6 hours with 17 parts of p-sulphamyl thiobenzamide and 120 parts by volume of alcohol. The product is worked up as described in Example 1. The pure 2-(p-sulphamylphenyl)-4-(p'-carbethoxy-phenyl)-thiazole-5-carboxylic acid ethyl ester melts at 161–163.5°.

To produce 2-(p-sulphamyl-phenyl)-4-(p-carboxy-phenyl)-thiazole-5-carboxylic acid, saponification is performed as described in Example 1. Decomposition: 300–315°.

EXAMPLE 6

33 parts of chloro-oxalacetic acid diethyl ester are refluxed for 6 hours with 33 parts of p-sulphamyl thiobenzoamide and 200 parts by volume of alcohol. The product is worked up as described in Example 1. The pure 2-(p-sulphamyl-phenyl)-thiazole-4.5-dicarboxylic acid diethyl ester melts at 137–139°.

Saponification is performed as described in Example 1. The 2-(p-sulphamyl-phenyl)-thiazole-4.5-dicarboxylic acid decomposes at about 237°.

EXAMPLE 7

33 parts of β-bromo-levulinic acid ethyl ester are refluxed for 4 hours with 150 parts by volume of alcohol and 32 parts of p-sulphamyl thiobenzamide. The product is worked up as described in Example 1. The pure 2-(p-sulphamyl-phenyl)-4-methyl-thiazole-5-acetic acid ethyl ester melts at 149–151°.

Saponification is performed as described in Example 1. The 2-(p-sulphamyl-phenyl)-4-methyl thiazole-5-acetic acid decomposes at about 203–205°.

In the following table, the esters A and the corresponding acids B of the Formula I, wherein $R_1$ and —CO—X—$R_2$ have the meanings given and $n$ always represents 0, can be obtained by the processes described in the above examples:

Table I

| No. | $R_1$ | A<br>—CO—X—$R_2$=—COO$C_2H_5$<br>M. P., degrees | B<br>—CO—X—$R_2$=—COOH<br>Decomposition, degrees |
|---|---|---|---|
| 1 | $CH_3$— | 204–206 | 248 |
| 2 | $C_2H_5$— | 179.5–181.5 | 231–232 |
| 3 | $CH_3CH_2CH_2$— | 160.5–162.5 | 234.5–236 |
| 4 | $(CH_3)_2CH$— | 200–202 | 236–237.5 |
| 5 | $(CH_3)_2CH$—$CH_2$— | 180–181.5 | 246.5–248 |
| 6 | $CH_3$—C$_6$H$_4$— | 176–179 | 234–235 |
| 7 | (CH$_3$)$_2$—C$_6$H$_3$— | 177–179.5 | 232–234 |
| 8 | $CH_3$—O—C$_6$H$_4$— | 174–176.5 | 231–232 |
| 9 | Cl—C$_6$H$_4$— | 230.5–232 | 240–242 |
| 10 | $CH_3$—C$_6$H$_3$(CH$_3$)—CH$_2$— | 177.5–180 | 237–239.5 |
| 11 | C$_6$H$_{11}$—CH$_2$—CH$_2$— | 162–165 | 232–233 |
| 12 | cyclopropyl— | 195–197 | 272–273 |
| 13 | C$_6$H$_5$—CH$_2$— | 195–197 | 241–243 |
| 14 | $CH_3$—O—CH$_2$— | 143–145 | 236–238 |
| 15 | thienyl— | 188–190 | 233–234 |
| 16 | C$_6$H$_5$— | (methyl ester 238–240) | 252–254 |
| 17 | (n—$C_4H_9$)$_2$CH— | 176–178 | |
| 18 | (CH$_3$)$_2$CH—C$_6$H$_{10}$—CH$_3$ | 169–171 | 222–224 |
| 19 | naphthyl— | 181–183 | 238–240 |
| 20 | naphthyl—CH$_2$— | 186–188 | |
| 21 | (CH$_3$)$_2$—C$_6$H$_9$—CH$_2$—CH$_2$— | 182–184 | |
| 22 | methylenedioxyphenyl— | 205–207 | |

*Table I.*—Continued

| No. | R₁ | A<br>—CO—X—R₂=—COOC₂H₅<br>M. P., degrees | B<br>—CO—X—R₂=—COOH<br>Decomposition, degrees |
|---|---|---|---|
| 23 | n-C₇H₁₅— | 135–137 | |
| 24 | n-C₆H₁₃— | 153–155 | |
| 25 | ⌬—CH₂—CH₂—CH₂— | 163–164 | |
| 26 | ⌬—CH₂—CH—<br>      |<br>      CH₃ | 171–173 | |
| 27 | furfuryl (O) | 193–195 | |
| 28 | thienyl (S)—CH₂—CH₂— | 155–157 | |

EXAMPLE 8

29.8 parts of 2-(p-sulphamyl-phenyl)-4-methyl-thiazole-5-carboxylic acid are refluxed for 8 hours with 175 parts of thionyl chloride and the excess thionyl chloride is distilled off in the vacuum. To obtain the most complete removal of thionyl chloride possible, petroleum ether or another inert solvent is added twice. The wax-like residue is rubbed with 50 parts by volume of a 25% aqueous ammonia solution until it becomes pulverulent. It is then filtered off, washed with water and recrystallised from alcohol. 2-(p-sulphamyl-phenyl)-4-methyl thiazole-5-carboxylic acid amide melts at 266°.

2-(p-sulphamyl-phenyl)-4-methyl-thiazole-5-carboxylic acid diethyl amide (M. P. 181–193°) and 2-(p-sulphamyl-phenyl)-4-methyl-thiazole-5-carboxylic acid diethylamino ethylamide (M. P. 162–164°) are obtained in an analogous manner from the above mentioned carboxylic acid chloride and the corresponding amines.

EXAMPLE 9

The wax-like crude carboxylic acid chloride mentioned in Example 8 is heated for 1 hour in a water bath with 100 parts of morpholine. The solution obtained is poured into water whereupon 2-(p-sulphamyl-phenyl)-4-methyl-thiazole-5-carboxylic acid morpholide separates out. After recrystallising from alcohol it melts at 223–226°.

EXAMPLE 10

34.0 parts of 2-(p-sulphamyl-phenyl)-4-isobutyl-thiazole-5-carboxylic acid are refluxed for half an hour with 175 parts of thionyl chloride and 0.5 part of pyridine and then evaporated to dryness in the vacuum. The wax-like residue is rubbed with 200 parts of a 25% aqueous ammonia until it becomes pulverulent when it is filtered off. The 2-(p-sulphamyl-phenyl)-4-isobutyl-thiazole-5-carboxylic acid amide so obtained is recrystallised from N-butanol and melts at 199–201°.

EXAMPLE 11

The residue described in Example 10 is dissolved in hot chloroform and poured into 50 parts of morpholine. The mixture is then evaporated to dryness in the vacuum and the residue is recrystallised from diluted alcohol. The 2-(p-sulphamyl-phenyl)-4-isobutyl-thiazole-5-carboxylic acid morpholide so obtained melts at 211–213°.

EXAMPLE 12

34.0 parts of 2-(p-sulphamyl-phenyl)-4-isobutyl-thiazole-5-carboxylic acid are converted into the acid chloride according to Example 10. The crude product is refluxed for 1 hour with 200 parts of benzyl alcohol and 130 parts of pyridine. After evaporating off the excess benzyl alcohol and the pyridine in the vacuum, a crystalline residue consisting of 2-(p-sulphamyl-phenyl)-4-isobutyl-thiazole-5-carboxylic acid benzyl ester is obtained. After recrystallising from alcohol, it melts at 172–174°.

In an analogous manner, the esters given in Table II are obtained from the above acid chloride or the 2-(p-sulphamyl - phenyl) - 4 - methyl - thiazole - 5 - carboxylic acid chloride produced according to Example 8 and from the corresponding alcohols:

*Table II*

| No. | R₁ | CO—X—R₂ | M. P., degrees |
|---|---|---|---|
| 1 | CH₃ | —COOCH(CH₃)₂ | 208–210 |
| 2 | CH₃ | —COOCH₂—⌬ | 186–188 |
| 3 | CH₃ | —COOCH₂CH₂—N(C₂H₅)₂ | 148–149 |
| 4 | (CH₃)₂CH—CH₂— | —COOCH(CH₃)₂ | 157–159 |
| 5 | (CH₃)₂CH—CH₂— | —COOCH₂CH₂—N(C₂H₅)₂ | 113–116 |

Daily doses of 100–500 mg. of the compounds according to the present invention, e. g. of 2-(p-sulphamyl-phenyl)-4-isopropyl - thiazole - 5 - carboxylic acid ethyl ester or of 2-(p-sulphamyl-phenyl) - 4 - benzyl-thiazole-5-carboxylic acid are administered perorally to obtain a good diuretic effect in man. The daily dosage necessary can be contained in, for example, 1–2 tablets or other dosage unit forms.

What we claim is:

1. A p-substituted benzene sulphonamide corresponding to the formula:

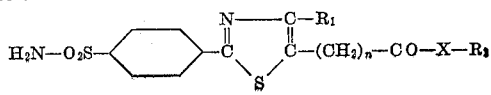

wherein $R_1$ represents a member selected from the group consisting of hydrogen, lower alkyl, methoxymethyl, —COOH, cyclohexyl, β-phenylethyl, benzyl, γ-phenylpropyl, dimethylbenzyl, phenyl, chlorophenyl, methylphenyl, methoxyphenyl, methylendioxyphenyl, carboxyphenyl and carbethoxyphenyl; $R_2$ by itself represents a member selected from the group consisting of hydrogen, lower alkyl, benzyl and diethylaminoethyl; X by itself represents a member selected from the group consisting of oxygen and NH; X—$R_2$ together represent the diethylamino group and the morpholino group; and $n$ represents one of the numerals 0 and 1.

2. 2 - (p - sulphamyl - phenyl) - 4 - isopropyl - thiazole-5 - carboxylic acid ethyl ester.

3. 2 - (p - sulphamyl - phenyl) - 4 - benzyl - thiazole-5 - carboxylic acid.

4. 2 - (p - sulphamyl - phenyl) - 4 - isobutyl - thiazole-5 - carboxylic acid amide.

5. 2 - (p - sulphamyl - phenyl) - 4 - (p - chlorophenyl)-thiazole - 5 - carboxylic acid.

6. 2 - (p - sulphamyl - phenyl) - 4 - cyclohexyl-thiazole-5 - carboxylic acid methyl ester.

No references cited.